(12) United States Patent
Bouchex Bellomie

(10) Patent No.: US 8,578,021 B2
(45) Date of Patent: Nov. 5, 2013

(54) PERFORMANCE MEASUREMENT AND SERVICE QUALITY MONITORING SERVER USING A COMMAND LINE INTERFACE

(75) Inventor: Sebastien Bouchex Bellomie, Vanves (FR)

(73) Assignee: Infovista, Les Ulis (FR)

( * ) Notice: Subject to any disclaimer, the term of this patent is extended or adjusted under 35 U.S.C. 154(b) by 127 days.

(21) Appl. No.: 12/949,189

(22) Filed: Nov. 18, 2010

(65) Prior Publication Data

US 2011/0173317 A1 Jul. 14, 2011

(30) Foreign Application Priority Data

Nov. 19, 2009 (FR) ...................................... 09 58164

(51) Int. Cl.
*G06F 15/173* (2006.01)

(52) U.S. Cl.
USPC .......................................................... 709/224

(58) Field of Classification Search
USPC .......................................................... 709/224
See application file for complete search history.

(56) References Cited

U.S. PATENT DOCUMENTS

| | | | | |
|---|---|---|---|---|
| 7,010,780 B2* | 3/2006 | Perycz et al. | .................. | 717/107 |
| 7,451,208 B1* | 11/2008 | Bakke et al. | .................. | 709/224 |
| 7,606,895 B1* | 10/2009 | Dini et al. | ...................... | 709/224 |
| 2002/0083034 A1* | 6/2002 | Orbanes et al. | .................... | 707/1 |
| 2003/0120822 A1* | 6/2003 | Langrind et al. | .............. | 709/251 |
| 2005/0091482 A1* | 4/2005 | Gray et al. | ..................... | 713/151 |
| 2008/0137549 A1* | 6/2008 | Manthoulis | .................... | 370/252 |
| 2009/0019422 A1* | 1/2009 | Loughlin et al. | .............. | 717/106 |
| 2010/0077075 A1* | 3/2010 | Cuni et al. | .................... | 709/224 |
| 2010/0322089 A1* | 12/2010 | Raja et al. | ...................... | 370/252 |
| 2011/0112790 A1* | 5/2011 | Lavie et al. | ................... | 702/123 |
| 2011/0173317 A1* | 7/2011 | Bouchex Bellomie | ....... | 709/224 |
| 2012/0011173 A1* | 1/2012 | Ohata et al. | .................. | 707/812 |
| 2012/0182865 A1* | 7/2012 | Andersen et al. | ............. | 370/228 |
| 2012/0197965 A1* | 8/2012 | McCanne et al. | ............. | 709/202 |

* cited by examiner

*Primary Examiner* — Ian N Moore
*Assistant Examiner* — Phong La
(74) *Attorney, Agent, or Firm* — Greer, Burns & Crain, Ltd.

(57) ABSTRACT

A performance measurement and service quality monitoring server capable of collecting performance information within a set of equipment over a communication network, the server integrating a generic performance model comprising high-level indicators, a performance model dedicated to each type of equipment and provided with equipment-oriented indicators and an SNMP model to sample equipment as well as an interfacing model, known as a CLI model to sample equipment according to a CLI (Command Line Interface) mechanism.

10 Claims, 6 Drawing Sheets

PERFORMANCE MEASUREMENT AND SERVICE QUALITY MONITORING SERVER USING A COMMAND LINE INTERFACE

BACKGROUND

The present invention relates to a performance measurement and service quality monitoring server capable of collecting performance information within a set of equipment over a communication network, this server comprising a generic performance model to process high-level indicators and dedicated performance models for each type of equipment to be monitored.

The increasing complexity of information systems integrating in particular, client-server architectures and integrated local area networks, makes effective management of the quality of service more and more difficult within these systems. On the one hand, the administrators and managers of these information systems are led to adopt a service approach towards users and to operate as service providers concerned about the quality of services provided at the same time as being faced with reductions in operating costs, and on the other hand, the users of these services demand yet higher levels of quality of service.

Control over the quality of service involves a reliable feedback system of relevant information originating from the different resources of the information system. It is, however, difficult to make use of the large-volume performance data references residing in the network equipment, in the systems and in the software applications, to consolidate such data and then to reconstruct it in the form of summary status reports for the purpose of capacity or service quality management. There is a need, on the one hand, for management of service quality at user level: availability, application response time, reactivity in the event of a technical support incident and, on the other hand, for management of technical service quality with respect to the infrastructure itself: traffic, network transit time, consumption of central processing unit time, etc.

Moreover, there are numerous different operating systems. In order to be able to manage the greatest number of resources, it is sometimes necessary to develop a dedicated application for each operating system. The purpose of such applications is to provide for communication between the resource to be managed (network equipment) and the remote management server. In this respect, there is, for example the Patrol application from BMC Software®, which needs to be installed, configured and administered in network equipment, which may be an interconnection node subject to a great load. Such an application is highly intrusive and this constitutes a considerable constraint, which may present risks of incompatibility or at least disruption of the operating system in the network equipment. Such an implementation does not offer any guarantees of maximum stability.

There is also the SNMP agent (Simple Network Management Protocol), providing for remote or local administration on Internet type networks. This method displays a certain amount of information through MIB files specific to each piece of hardware and manufacturer.

Now, it may be the case that:
some equipment does not have an SNMP interface allowing for the collection of performance data,
equipment is fitted with an SNMP agent, but some performance data are not accessible through this SNMP agent,
some performance data are no longer accessible in SNMP owing to developments in the software used on the equipment or to security constraints.

SUMMARY

The present invention aims to overcome the above disadvantages by proposing a new server for feeding back all the relevant information from any type of equipment. Another purpose of the invention is to propose a server which is not very intrusive.

At least one of the above mentioned objectives can be achieved with a performance measurement and service quality monitoring server capable of collecting performance information within a set of equipment over a communication network, the server comprising:
  a generic performance model to
    produce performance data acquisition requests within said equipment
    calculate performance indicators from said performance data, and
    supply performance and/or service quality reports,
  a dedicated performance model for each type of equipment; for a given equipment, this performance model being capable of acquiring performance data from said equipment given in response to acquisition requests,
  an SNMP model, intercalated between the dedicated performance model and the equipment in question, to communicate by SNMP request with an SNMP agent for the equipment in question and transmit performance data received from this equipment in question to the dedicated performance model according to a specific protocol.

According to the invention, the server also comprises, in parallel to the SNMP model,
  an interfacing model, called a CLI model, intercalated between the dedicated performance model and the equipment in question to communicate according to a CLI (Command Line Interface) mechanism with a CLI agent for said equipment in question; this CLI model being capable of generating command scripts to the CLI agent and transmit performance data received from the equipment in question to the dedicated performance model; this CLI model communicating with the dedicated performance model according to said specific protocol.

By type of equipment is meant, for example, classification by different equipment manufacturers, this equipment possibly being a router, a switch or any other network equipment.

With the server according to the invention, it is possible to collect information within any type of equipment either according to the SNMP protocol or according to the CLI protocol, successively or simultaneously. This provides access, with a single performance measurement server, to performance information which is not accessible with the SNMP protocol or within equipment which does not offer this SNMP protocol.

Performance indicators are high-level indicators such as traffic, error rate, bandwidth consumption, hard disk usage rate, memory usage rate, etc, which are
independent of the type of equipment to be sampled, while the software layer comprising the dedicated performance models is a hardware-oriented software layer. Each dedicated performance model uses indicators specific to a given piece of equipment. Thus, depending on the software versions operating on the equipment, the user can choose the SNMP model or the CLI model while still using the high-level performance indicators as usual. Depending on the equipment to be sampled, the server interprets these high-level performance indicators in order to interrogate the equipment through SNMP or CLI as appropriate.

The CLI model is intelligently integrated into the performance measurement server since it uses the same language as the SNMP model to communicate with the dedicated performance model. The whole then constitutes a complete multi-manufacturer meta-model. It is not necessary to develop and deploy new applications (API) within equipment to make up for the inadequacy of the SNMP protocol. This remains not very intrusive when advantageously using a CLI protocol which forms part of the basic components of any operating system and which is present in all network equipment.

The CLI model communicates with the CLI agent for the equipment using the CLI protocol, which integrates services such as SSH or Telnet. This requires greater control of the use of the resources of the equipment under supervision than SNMP. In fact, SNMP is by definition a light protocol using few system resources (no permanent connection, little traffic), while the CLI protocol uses a permanent connection and may therefore potentially consume more resources, depending on the commands executed.

In order to manage these problems with the usage of resources and limit the impact of commands on the equipment, which should mainly devote its resources (processor, memory) to its main functions, the interfacing model according to the invention comprises:
 a command module to communicate with the CLI agent for the equipment in question, and
 at least one analysis module to analyse the result transmitted by the CLI agent.

With the method according to the invention, it is possible to define a connected mode for which there is communication with the CLI agent for the equipment and a non-connected mode in which the message originating from the equipment is analysed so as to identify useful information. This useful information may be a number of bytes passing through a piece of equipment, a ratio between the memory space available and unavailable, etc. This makes it possible to economise on the resources of the equipment under supervision, which are only activated in connected mode.

It is also possible to envisage several analysis modules to be configured simultaneously to analyse several different types of performance data contained in a single message returned by the CLI agent.

According to an advantageous characteristic of the invention, the command script may comprise a unique command associated with a group of variables in order to collect at the same time at least as much performance data as variables.

In particular, when the command scripts comprise multidimensional variables, the CLI model is configured to receive performance data and:
 split only indexed data into blocks,
 extract index values, and
 extract values of variables.

According to another advantageous characteristic of the invention, the command script comprises a command which can be programmed so as to collect an indexed table or a part of this indexed table.

In addition in particular to the above, still with a view to limiting intrusion within the equipment, the server according to the invention provides that:
 each interfacing model is configured so as not to exceed a predetermined number of simultaneous connections to a given piece of equipment.
 each interfacing model is configured so as not to exceed a predetermined rate of execution of commands on a given piece of equipment.
 each interfacing model is configured so as not to exceed a predetermined period of disconnection from a piece of equipment following execution of a set of commands.

BRIEF DESCRIPTION OF THE DRAWINGS

Other advantages and characteristics of the invention will become apparent on examination of the detailed description of an embodiment which is in no way limitative, and the attached diagrams, in which.

DETAILED DESCRIPTION

Figure 1:
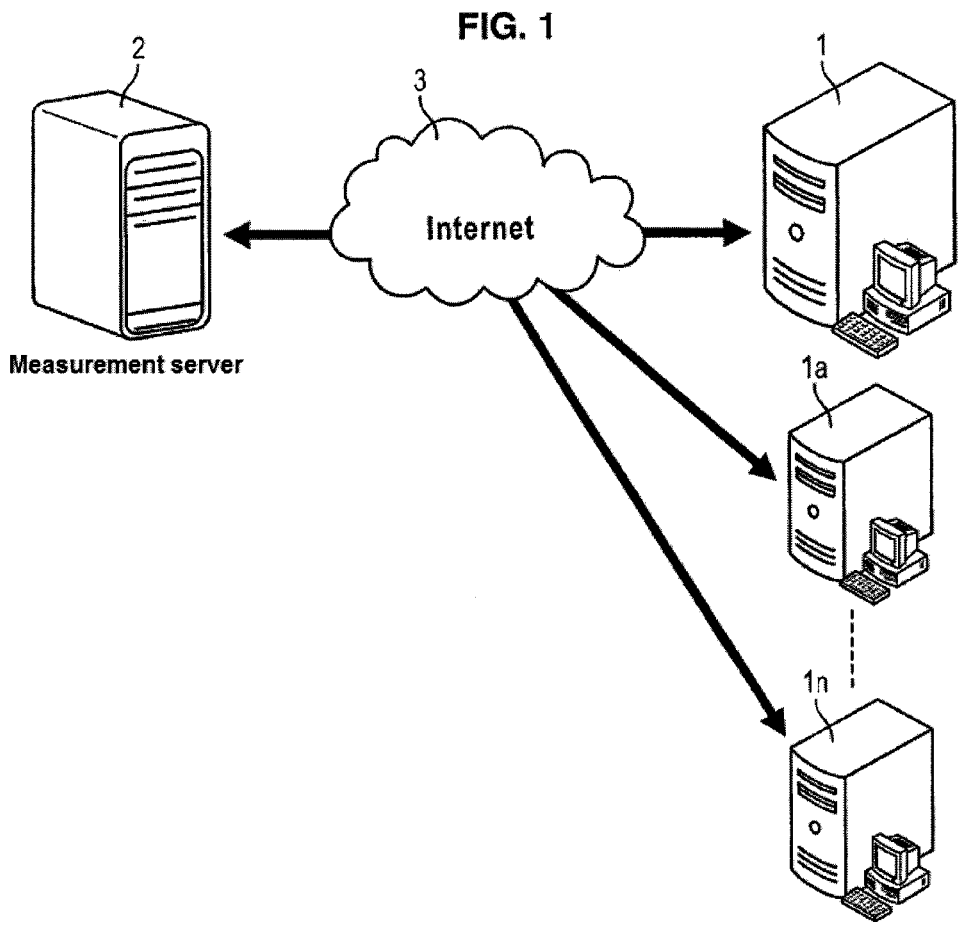
FIG. 1 is a general view of a system implementing a method according to the present invention.

FIG. 1 shows a target server 1 for which the performance and quality are to be constantly measured. Other target servers 1a-1n can also be monitored. The management server 2 according to the invention is linked to the target servers over a communication network 3 such as the Internet or a local network and is intended to manage the performance and service quality of the target servers. The following can be measured in particular:
 memory consumption,
 processor activity, and
 disk activity.

In order to make these measurements, the present invention provides for the use of a command interface CLI, which is not initially intended to recover performance data.

Generally, the CLI (Command Line Interface or command prompt) is a network equipment configuration interface and also provides for configuration of the equipment and day-to-day maintenance.

The CLI is a mechanism providing for interaction with an operating system or equipment software by typing commands for specific tasks. This is an interface commanded by text only, which contrasts with the use of a mouse associated with a graphical interface (GUI).

Figure 2:
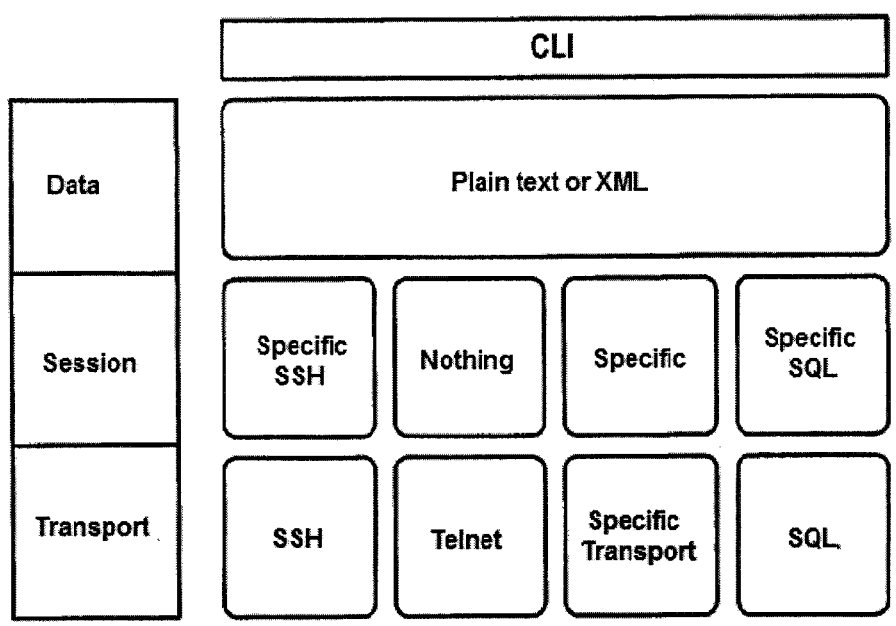
FIG. 2 is a general view of a CLI model according to the invention.

The text interface retains numerous advantages in comparison with graphical environments, such as:
 accuracy and simplicity of automation of tasks (batch mode)
 remote control
 uniformity
 stability, and
 low consumption of resources FIG. 2 shows that this communication interface uses a network connection based on a protocol such as SSH (Secured Shell) or Telnet. Other communication protocols may be envisaged, such as, for example TL1, Corba, SQL or any other specific non-standard protocol.

The CLI is used by sending commands in "text" format on the equipment. Then, the equipment returns the result of the command over the same channel on which it was sent.

The results produced by execution of the command are in text form and are non-structured, i.e. the data are in plain text with no formatting.

For example, the following command may be sent over a router:

show system users

The result returned by the router is:

```
2:12PM up 12 days, 3:12, 4 users, load averages: 0.24, 0.27, 0.24
USER     TTY     FROM              LOGIN@ IDLE WHAT
qa       p0      aaaaa.iv.local    9:40AM 28 -cli (cli)
qa       p1      ccccc.iv.local    2:12PM - -cli (cli)
qa       p2      bbbbb.iv.local    2:12PM - -cli (cli)
qa       p4      ddddd.iv.local    Fri06PM 21:54 -cli (cli)
```

As can be seen in FIG. 2, other formats can be used, such as, for example XML format in which the results are structured. For example, the command to be sent may be:

<get-system-users-information>

The result returned by the router is:

```
<rpc-reply mlns:junos="http://xml.juniper.net/junos/7.4R2/junos">
    <system-users-information
xmlns="http://xml.juniper.net/junos/7.4R2/junos">
        <uptime-information>
            <date-time junos:seconds="1244635983">2 : 13PM </date-time>
            <up-time junos:seconds="1048359">12 days, 3:12</up-time>
            <active-user-count junos:format="3 users">3</active-user-count>
            <load-average-1>0.22</load-average-1>
            <load-average-5>0.26</load-average-5>
            <load-average-15>0.24</load-average-15>
            <user-table>
                <user-entry>
                    <user>qa</user>
                    <tty>p0</tty>
                    <from>aaaaa.iv.local</from>
                    <login-time junos:seconds="1244619656">9:40AM</login-time>
                    <idle-time junos:seconds="1744">29</idle-time>
                    <command>-cli (cli)</command>
                </user-entry>
                <user-entry>
                    <user>qa </user>
                    <tty>p2</tty>
                    <from>bbbbb.iv.local</from>
                    <login-time junos:seconds="1244635941">2:12PM</login-time>
                    <idle-time junos:seconds="0">-</idle-time>
                    <command>-cli (cli)</command>
                </user-entry>
                <user-entry>
                    <user>qa</user>
                    <tty>p4</tty>
                    <from>ddddd.iv.local</from>
                    <login-time junos:seconds="1244217816">Fri06PM</login-time>
                    <idle-time junos:seconds="78888">21:54</idle-time>
                    <command>-cli (cli)</command>
                </user-entry>
            </user-table>
        </uptime-information>
    </system-users-information>
    <cli>
        <banner></banner>
    </cli>
</rpc-reply>
```

The present invention makes it possible to produce and transmit dedicated commands to any network equipment from performance data acquisition requests. These commands are transmitted and their results are recovered using the CLI interface. These results are processed and then transmitted to a generic performance management system.

Figure 3:
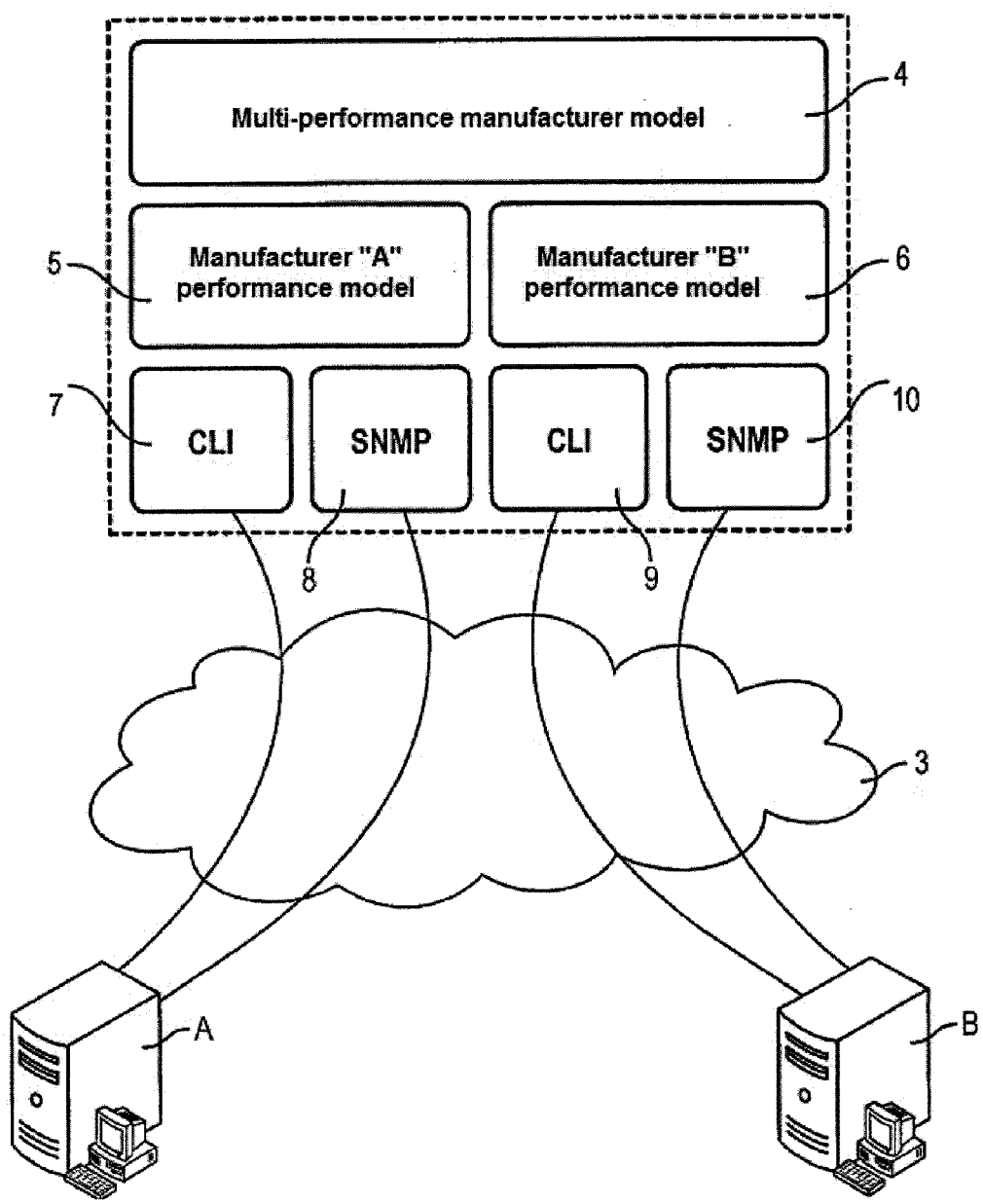
FIG. 3 is a diagrammatic representation of a meta-model according to the invention.

FIG. 3 shows a diagrammatic representation of a meta-model within the management server according to the invention. In practice, this meta-model is produced in order to structure the different elements of the server according to the invention and possibly to have complete integration with an existing performance measurement and service quality monitoring application. Such an application already handles performance indicators over an SNMP interface. But, with the invention, this application will also be able to sample any equipment using the CLI protocol.

FIG. 3 shows a multi-manufacturer performance model 4, which is a generic model able to sample several pieces of network equipment with different characteristics, for example pieces of equipment from different manufacturers. This performance model comprises, for example a performance management server application handling performance indicators. This may be an SMI (Structure of Management Information) model originally developed for the SNMP protocol, which is enhanced in order to integrate new CLI functionalities.

The purpose of the multi-manufacturer performance model 4 is to provide the user in graphical or other form with information relating in particular to bandwidth, network consumption, incoming and outgoing traffic, error rate, collisions, CPU consumption, hard disk usage rate, etc.

This multi-manufacturer performance model 4 interacts with a performance model 5 dedicated to a piece of equipment "A" (or to a manufacturer or to a set of pieces of equipment) and with another performance model 6 dedicated to a piece of equipment "B" (or to a manufacturer or to a set of pieces of equipment). Each dedicated performance model 5 and 6 comprises a description of the equipment to which it is dedicated. Each model 5 and 6 is configured to act as a router and converter of communications between the multi-manufacturer performance model 4 and the CLI and SNMP models 7-10. Each CLI model comprises a command line interface associated with a command module to send scripts to equipment A or B and an analysis module to receive and analyse the results originating from the equipment in question. Each SNMP model communicates with the respective equipment by sending an SNMP request and exchanging an MIB file.

The CLI 7 and SNMP 8 models are dedicated to equipment A. The CLI 9 and SNMP 10 models are dedicated to equipment B. The user has the choice of communicating either in SNMP or in CLI with each equipment being monitored.

The invention is in particular remarkable for the fact that it does not require any deployment of third-party products on the equipment to be monitored. In fact, all equipment has a CLI interface and the protocols used are existing protocols. Furthermore, it is independent of the technology being monitored. It is not based on the technologies of each manufacturer, since it does not require any use of an "API".

The multi-manufacturer performance model 4 defines high-level indicators using "equipment-oriented" indicators within each dedicated performance model 5 and 6. Depending in particular on the software versions operating on the equipment, the user can choose to use SNMP or CLI oriented indicators.

The invention makes it possible to model CLI commands and scripts in order to integrate them into the SMI model. This enhancement is accompanied by the following characteristics:
- definition of command scripts for executing commands on the equipment
- definition of analysis scripts for analysing the result of commands previously executed, and
- sharing of commands for several variables in order to reduce the impact on the equipment being monitored.

In order to minimise the impact on the equipment to be monitored, it is provided not to execute the same command twice in succession. On the basis of this constraint, a command associated with a group of variables is advantageously defined. Defining this command in this way has the advantage of guaranteeing the consistency of the data within a single group, since both variables are assigned values at the same moment in time.

Figure 4:
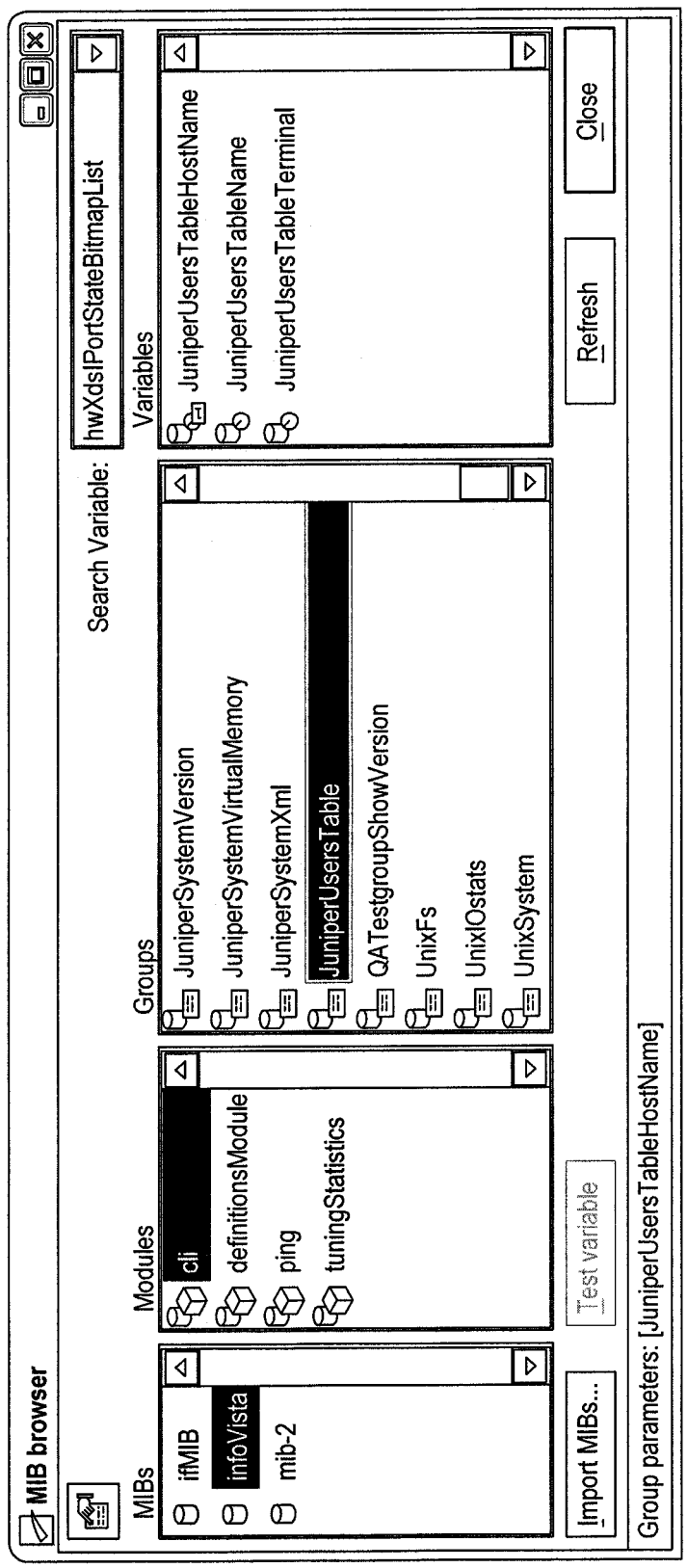
FIG. 4 is a view of a graphic window illustrating the breakdown of commands into groups of variables.
Figure 5:
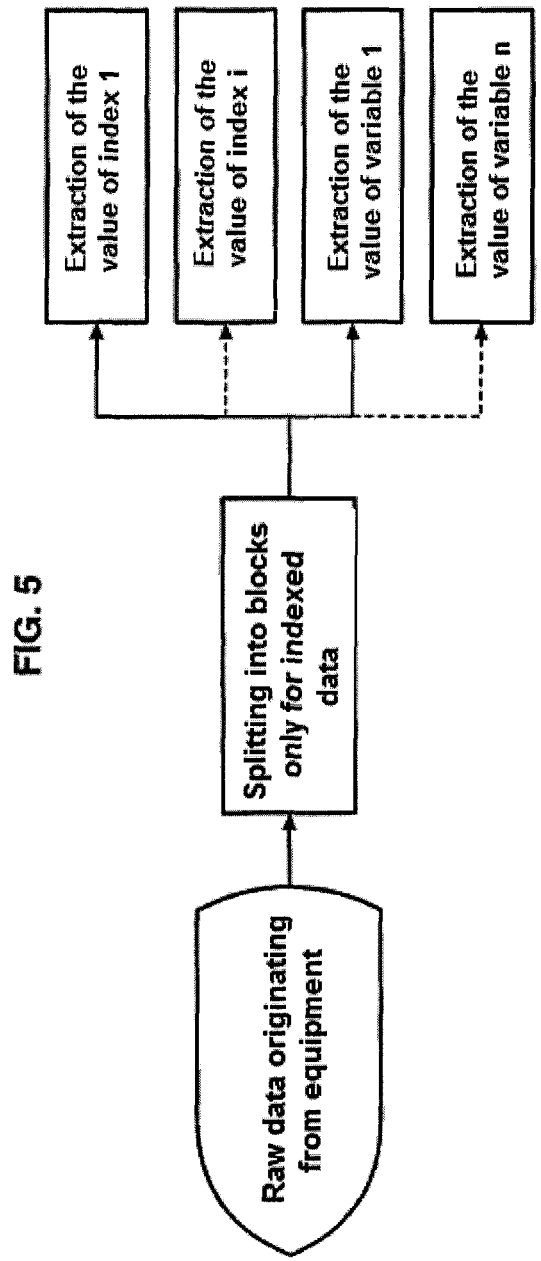
FIG. 5 is a diagrammatic representation illustrating functional blocks in a useful data extraction process according to the invention.

Example: as can be seen in FIG. 4, a command can be associated with a group JuniperUsersTable. The command is valid for all the variables in the group:
   JuniperUsersTableHostName
   JuniperUsersTableName
   JuniperUsersTableTerminal Moreover, analysis scripts associated with a group of variables (for the management of indexed data) and with variables for the extraction of useful data can be defined within CLI models. In fact, once the data have been returned by the equipment, it is necessary to extract the useful data therefrom. In order to manage multidimensional variables in particular, it is necessary to extract the index values. A multidimensional variable makes it possible to recover several pieces of data, for example a name associated with an index. With this type of variable, it is possible to recover data in the form of a table or a matrix, each line or column corresponding for example to a user. The extraction of such data is performed as illustrated in FIG. 5, where:
   raw data originating from the equipment being monitored are recovered
   only indexed data are split into blocks
   index values are extracted, and
   values of variables are extracted at the same time.

Splitting into blocks is carried out through an analysis script, which splits the raw data into distinct blocks where it is possible to extract the values for each variable. This splitting is performed through a JavaScript script or an XPath chain (for XML).

Referring again to the above example, the following JavaScript script is used to perform the splitting:

```
var t = ivGetInputValue( ).split("\n");
for (var i=2;i<t.length;i++)
{
    if (t[i].length > 1)
        ivAddOutputValue(t[i]);
}
```

The function ivGetInputValue can be used to recover data originating from the equipment.

The function ivAddOutputValue can be used to transmit the recovered and then processed data to modules for the extraction of indices and variables.

And this gives a table of raw data from which the useful data must be extracted:

| qa | p1 ccccc.iv.local | 2:12PM - | -cli (cli) |
| qa | p2 bbbbb.iv.local | 2:12PM - | -cli (cli) |
| qa | p4 ddddd.iv.local | Fri06PM 21:54 | -cli (cli) |

The data may contain one or more indexes 1 to i, one or more variables 1 to n. There are planned to be as many extraction scripts as variables and indexes, each script examining all the lines or columns of the table or the matrix to recover the desired index or variable value.

The extraction of index values or variables may also be performed through a JavaScript script or a XPath chain (for XML).

Referring again to the above example, the following JavaScript script is used to extract the values:

var t=ivGetInputValue( ).split(" ");

ivSetOutputValue(t[0]);

The function ivSetOutputValue can be used to transmit the data extracted to a manufacturer performance model.

Figure 6:
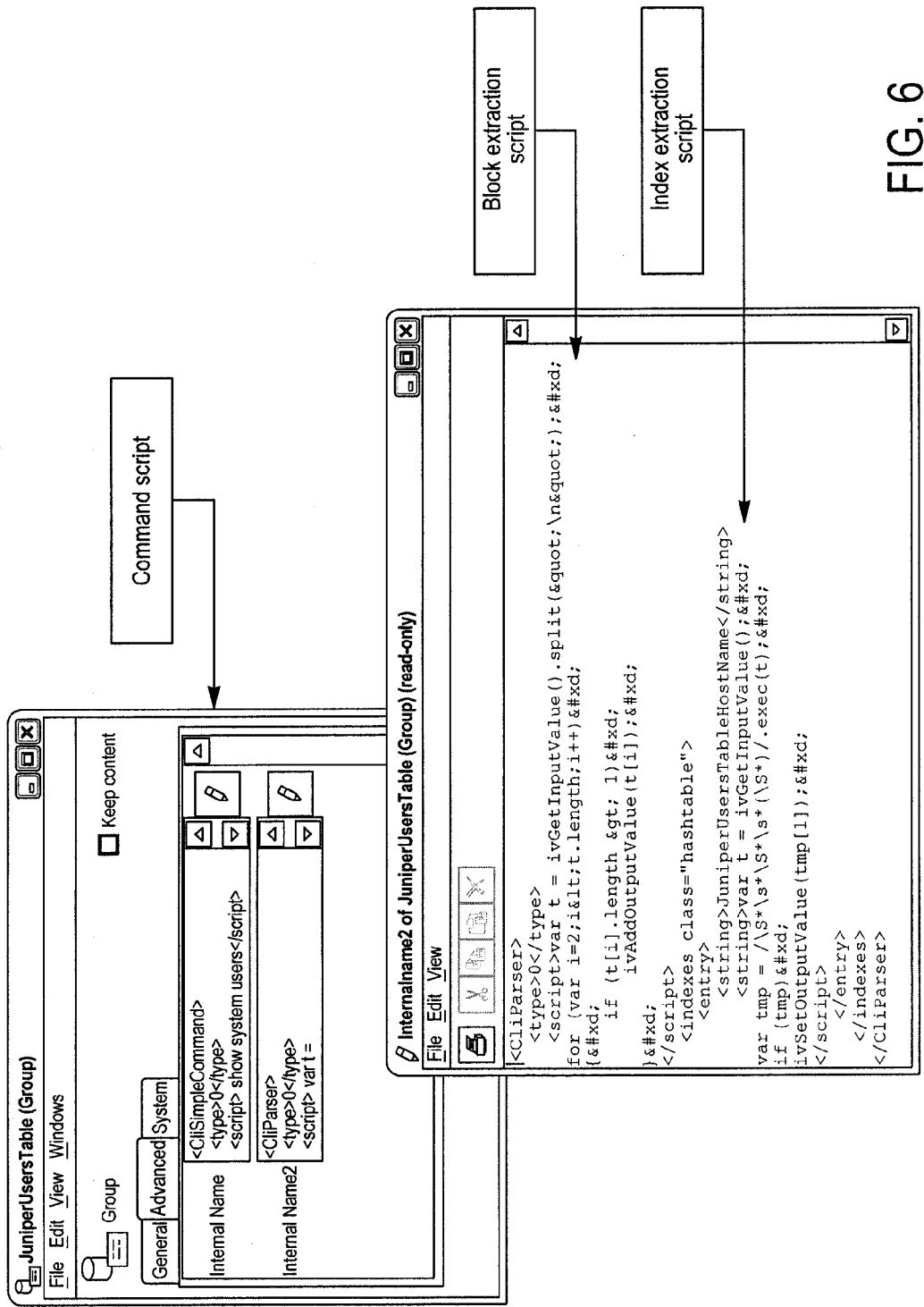
FIGS. 6 and 7 are views of graphic windows illustrating the block, variable and index extraction scripts in accordance with FIG. 4.
Figure 7:
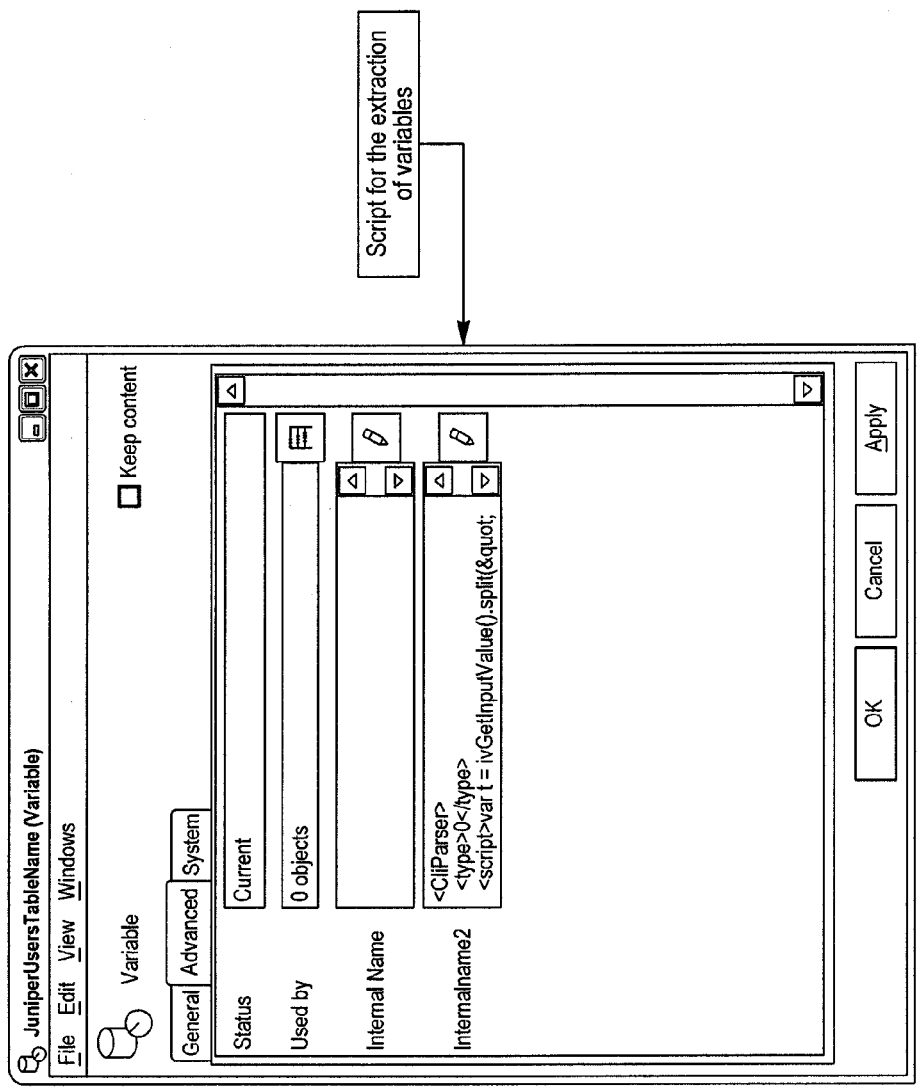

FIG. 6 shows a window illustrating a command script and block and index extraction scripts. FIG. 7 shows a window illustrating scripts for the extraction of variables.

The present invention therefore provides for:
   integration into an existing performance management module through SNMP
   connection to equipment using the CLI interface, thus without having to deploy any particular software on the hardware to be monitored
   definition of the commands to be sent over the equipment
   definition of the method for the extraction of useful data using in particular a high-level programming language, and
   management of the problems of use of the resources (processor, memory) of the equipment.

Of course, the invention is not limited to the examples which have just been described and numerous adjustments can be made to these examples without exceeding the scope of the invention.

The invention claimed is:

1. A performance measurement and service quality monitoring server capable of collecting performance information within a set of equipment over a communication network, the server comprising:
   a processor capable of executing:
      a generic performance model to
         produce performance data acquisition requests within said set of equipment
         calculate performance indicators from said performance data, and
         supply performance or service quality reports;
      a plurality of dedicated performance models, each said dedicated performance model corresponding to a particular type of equipment; wherein for a given equipment, said corresponding dedicated performance model being capable of acquiring performance data from said given equipment in response to acquisition requests;
      an SNMP model, intercalated between each of the plurality of dedicated performance models and the set of equipment, to communicate by SNMP request with an SNMP agent for said given equipment and transmit performance data received from said given equipment to the dedicated performance model according to a specific protocol; and
   in parallel with each said SNMP model,
      an interfacing model, known as a CLI model, intercalated between the dedicated performance model and said given equipment to communicate according to a CLI (Command Line Interface) mechanism with a CLI agent for said equipment in question; said CLI model being capable of generating command scripts to the CLI agent and transmitting performance data received from said given equipment to the dedicated performance model; said CLI model communicating with the dedicated performance model according to said specific protocol,
   wherein each command script comprises a unique command associated with a group of variables to collect at the same time at least as much performance data as variables, and when the command scripts comprise multidimensional variables, the CLI model is configured to receive performance data and:
      split only indexed data into blocks,
      extract index values, and
      extract values of variables.

2. The server according to claim 1, wherein the interfacing model comprises:
   a command module to communicate with the CLI agent for said given equipment, and
   at least one analysis module to analyse the result transmitted by the CLI agent.

3. The server according to claim 2, wherein the analysis model acts in a mode not connected to the CLI agent.

4. The server according to claim 1, wherein the command script comprises a programmable command.

5. The server according to claim 4, wherein the command is parameterized so as to collect an indexed table.

6. The server according to claim 4, wherein the command is parameterized so as to collect a part of an indexed table.

7. The server according to claim 1, wherein each interfacing model is configured so as not to exceed a predetermined number of simultaneous connections to a given piece of equipment.

8. The server according to claim 1, wherein each interfacing model is configured so as not to exceed a predetermined rate of execution of commands on a given piece of equipment.

9. The server according to claim 1, wherein each interfacing model is configured so as not to exceed a predetermined period of disconnection from a piece of equipment following execution of a set of commands.

10. A performance measurement and service quality monitoring server capable of collecting performance information within a set of equipment over a communication network, the server comprising:
   a processor capable of executing:
      a generic performance model to
         produce performance data acquisition requests within said set of equipment
         calculate performance indicators from said performance data, and
         supply performance or service quality reports;
      a plurality of dedicated performance models, each said dedicated performance model corresponding to a particular type of equipment; wherein for a given equipment, said corresponding dedicated performance model being capable of acquiring performance data from said given equipment in response to acquisition requests;
      an SNMP model, intercalated between each of the plurality of dedicated performance models and the set of equipment, to communicate by SNMP request with an SNMP agent for said given equipment and transmit performance data received from said given equipment to the dedicated performance model according to a specific protocol; and
   in parallel with each said SNMP model,
   an interfacing model, known as a CLI model, intercalated between the dedicated performance model and said given equipment to communicate according to a CLI (Command Line Interface) mechanism with a CLI agent for said equipment in question; said CLI model being capable of generating command scripts to the CLI agent and transmitting performance data received from said given equipment to the dedicated performance model; said CLI model communicating with the dedicated performance model according to said specific protocol,
   wherein each interfacing model is configured so as not to exceed a predetermined rate of execution of commands on a given piece of equipment and so as not to exceed a predetermined period of disconnection from a piece of equipment following execution of a set of commands.

* * * * *